(12) United States Patent
Pittman et al.

(10) Patent No.: US 10,257,642 B2
(45) Date of Patent: Apr. 9, 2019

(54) SYSTEMS AND METHODS FOR CONVERTING AN ELECTRONIC DEVICE INTO A TRACKING DEVICE

(71) Applicant: Blyncsy, Inc., Salt Lake City, UT (US)

(72) Inventors: Mark Eric Pittman, Salt Lake City, UT (US); Patrick Barry Brown, Salt Lake City, UT (US); Jack Vines, Salt Lake City, UT (US); David Sacharny, Salt Lake City, UT (US)

(73) Assignee: Blyncsy, Inc., Salt Lake City, UT (US)

( * ) Notice: Subject to any disclaimer, the term of this patent is extended or adjusted under 35 U.S.C. 154(b) by 0 days.

(21) Appl. No.: 15/910,782

(22) Filed: Mar. 2, 2018

(65) Prior Publication Data
US 2018/0255423 A1 Sep. 6, 2018

Related U.S. Application Data

(60) Provisional application No. 62/466,242, filed on Mar. 2, 2017.

(51) Int. Cl.
*H04W 4/02* (2018.01)
*G08B 13/24* (2006.01)
(52) U.S. Cl.
CPC .......... *H04W 4/02* (2013.01); *G08B 13/2462* (2013.01)

(58) Field of Classification Search
CPC ............................ H04W 4/02; G08B 13/2462
See application file for complete search history.

(56) References Cited

U.S. PATENT DOCUMENTS

| 9,349,286 | B2 | 5/2016 | Benhammou |
| 9,842,495 | B2 | 12/2017 | Benhammou |
| 9,886,850 | B2 | 2/2018 | Benhammou |
| 2007/0139191 | A1* | 6/2007 | Quatro ................... G06Q 10/08 340/539.13 |
| 2013/0073336 | A1 | 3/2013 | Heath |
| 2014/0012498 | A1 | 1/2014 | Gustafson et al. |

* cited by examiner

*Primary Examiner* — Hongmin Fan
(74) *Attorney, Agent, or Firm* — Maschoff Brennan

(57) ABSTRACT

One embodiment may include a method of converting an electronic device into a tracking device that is part of a system of tracking devices distributed throughout a geographic area to track signal emitting devices travelling through the geographic area. The method may include providing an electronic device, the electronic device positioned in the geographic area; communicatively coupling a converter with the electronic device, wherein the converter has a memory device with location tracking software stored thereon; and uploading the tracking software from the converter to the electronic device so as to convert the electronic device into a converted tracking device having the tracking software, wherein the converted tracking device becomes part of the system of tracking devices distributed throughout the geographic area to track the signal emitting devices travelling through the geographic area.

20 Claims, 8 Drawing Sheets

SYSTEMS AND METHODS FOR CONVERTING AN ELECTRONIC DEVICE INTO A TRACKING DEVICE

CROSS-REFERENCE TO RELATED APPLICATIONS

This application claims the benefit of U.S. Provisional Patent Application No. 62/466,242, filed Mar. 2, 2017, which is incorporated herein by specific reference in its entirety.

This patent application cross-references each of U.S. application Ser. No. 14/947,352 filed Nov. 20, 2015; U.S. application Ser. No. 14/947,388 filed Nov. 20, 2015; U.S. Provisional No. 62/345,598 filed Jun. 3, 2016; U.S. Provisional No. 62/082,212 filed on Nov. 20, 2014; U.S. Provisional No. 62/127,638 filed on Mar. 3, 2015; U.S. Provisional No. 62/197,462 filed on Jul. 27, 2015; and U.S. Provisional No. 62/197,464 filed Jul. 27, 2015, which are hereby incorporated herein by specific reference in their entirety.

BACKGROUND

Tracking devices that can detect signals emitted from a mobile computing device can be used for tracking people that carry the devices. The ability to track the movement of people by using their devices (e.g., mobile devices, laptops, cars, or the like) can provide valuable information about the patterns of their movement, commutes, and locations they visit. Such information can be processed to determine demographics based on trends in the tracked data. Now that the tracking data can be acquired, the applications for analysis of the data and use of the data can be explored.

Previously, dedicated tracking devices have been created and deployed in order to achieve the tracking function. However, it can be costly to create and deploy a sufficient number of tracking devices to cover areas to accurately track the devices.

Therefore, it would be advantageous to be able to have a tracking network with a large number of tracking devices without having to create and deploy such tracking devices. It may also be advantageous to add additional functionalities to existing devices in order to for the existing devices to become tracking devices and also become part of the tracking network. Additionally or alternatively, it may be advantageous to supplement existing tracking networks with data from additional sources, such as additional tracking devices or electronic devices converted to tracking devices.

The claimed subject matter is not limited to embodiments that solve any disadvantages or that operate only in environments such as those described above. This background is only provided to illustrate examples of where the present disclosure may be utilized.

SUMMARY

The present disclosure generally relates to a tracking network with a large number of tracking devices without having to create and deploy such tracking devices. The tracking network may have devices that have additional functionalities added in order to for existing devices to become tracking devices and also become part of the tracking network.

One non-limiting embodiment may include a method of converting an electronic device into a tracking device that is part of a system of tracking devices distributed throughout a geographic area to track signal emitting devices travelling through the geographic area. The method may include providing an electronic device, the electronic device may be positioned in the geographic area. The method may include communicatively coupling a converter with the electronic device. The converter may have a memory device with location tracking software stored thereon. The method may include uploading the tracking software from the converter to the electronic device so as to convert the electronic device into a converted tracking device having the tracking software. The converted tracking device may become part of the system of tracking devices distributed throughout the geographic area to track the signal emitting devices travelling through the geographic area. The method may include receiving, at the converted tracking device, unique identifiers corresponding to at least one of the signal emitting devices travelling through the geographic area. At least one of the unique identifiers may have been previously received by at least one of the tracking devices of the system prior to being received at the converted tracking device. The receipt of the unique identifier may be indicative of a proximity of the converted tracking device to the signal emitting devices based on the range of signals upon which the unique identifier is received. The method may include tracking, by the system of tracking devices distributed throughout the geographic area, the translocation of the signal emitting devices as the signal emitting devices travel through the geographic area based at least in part on the unique identifiers received at the converted tracking device and the proximity of the converted tracking device to the signal emitting devices determined by the range of the signals upon which the unique identifier is received at the converted tracking device from the signal emitting devices.

The translocation of the signal emitting devices may be further tracked based on unique identifiers received at the other tracking devices distributed throughout the geographic area and the proximity of the other tracking devices to the signal emitting devices determined by the range of the signals upon which unique identifiers are received at the other tracking devices from the signal emitting devices. The converter may be positioned outside of the geographic area. The method may include analyzing the electronic device for components capable of functioning as a converted tracking device prior to uploading the tracking software. The method may include communicatively coupling the converted tracking device to a network and communicatively coupling the converted tracking device to a tracker server computing system via the network.

The electronic device may be a non-tracking device before receiving the tracker software. The electronic device may not have at least some of the tracking capabilities of the tracking software before the tracking software may be uploaded to the electronic device. The electronic device may be devoid of tracker software and incapable of performing a tracking functionality before the tracking software is uploaded to the electronic device. The converted tracking device may be a router, repeater, or other electronic device prior to having the tracking software.

The method may include tracking the signal emitting devices, including: operating the converted tracking device; detecting an SED signal with the converted tracking device; acquiring SED data from the SED signal with the converted tracking device; and/or transmitting the acquired SED data or portion thereof from the converted tracking device to a tracker server computing system. The method may include storing SED data or portion thereof on a memory device of the converted tracking device; analyzing the SED data with the converted tracking device or the tracker server computing system; and/or modifying the SED data with the converted tracking device by the converted tracking device or the tracker server computing system.

The unique identifiers may be consistent unique identifiers that do not change over time and do not include a telephone number or an international mobile equipment identity (IMEI) number.

In another embodiment, a tracking system may include signal emitting devices located in a geographic area; tracking devices distributed throughout the geographic area to track the signal emitting devices travelling through the geographic area; and/or at least one converted tracking device positioned in the geographic area. The converted tracking device may be an electronic device that has been converted by uploading tracking software from a converter to the electronic device so as to convert the electronic device into a converted tracking device having the tracking software. The converted tracking device may become part of the tracking devices distributed throughout the geographic area to track the signal emitting devices travelling through the geographic area. The converted tracking device may be configured to: receive unique identifiers corresponding to at least one of the signal emitting devices travelling through the geographic area. At least one of the unique identifiers may have been previously received by at least one of the tracking devices of the system prior to being received at the converted tracking device. The receipt of the unique identifier may be indicative of a proximity of the converted tracking device to the signal emitting devices based on the range of signals upon which the unique identifier is received.

The system may be configured to track, using the tracking devices distributed throughout the geographic area and the converted tracking device, the translocation of the signal emitting devices as the signal emitting devices travel through the geographic area based at least in part on the unique identifiers received at the converted tracking device and the proximity of the converted tracking device to the signal emitting devices determined by the range of the signals upon which the unique identifier is received at the converted tracking device from the signal emitting devices.

The translocation of the signal emitting devices may be further tracked based on unique identifiers received at the other tracking devices distributed throughout the geographic area and the proximity of the other tracking devices to the signal emitting devices determined by the range of the signals upon which unique identifiers are received at the other tracking devices from the signal emitting devices.

The system may include the converter, and the converter may be positioned outside of the geographic area. The system may include a network communicatively coupled to the converted tracking device and the tracking devices. The system may include a tracker server computing system communicatively coupled to the converted tracking device and the tracking devices via the network. The tracker server computing system may be communicatively coupled to the signal emitting devices via the network. The electronic device may be a non-tracking device before receiving the tracker software. The electronic device may not have at least some of the tracking capabilities of the tracking software before the tracking software is uploaded to the electronic device.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

DETAILED DESCRIPTION

Figure 1:
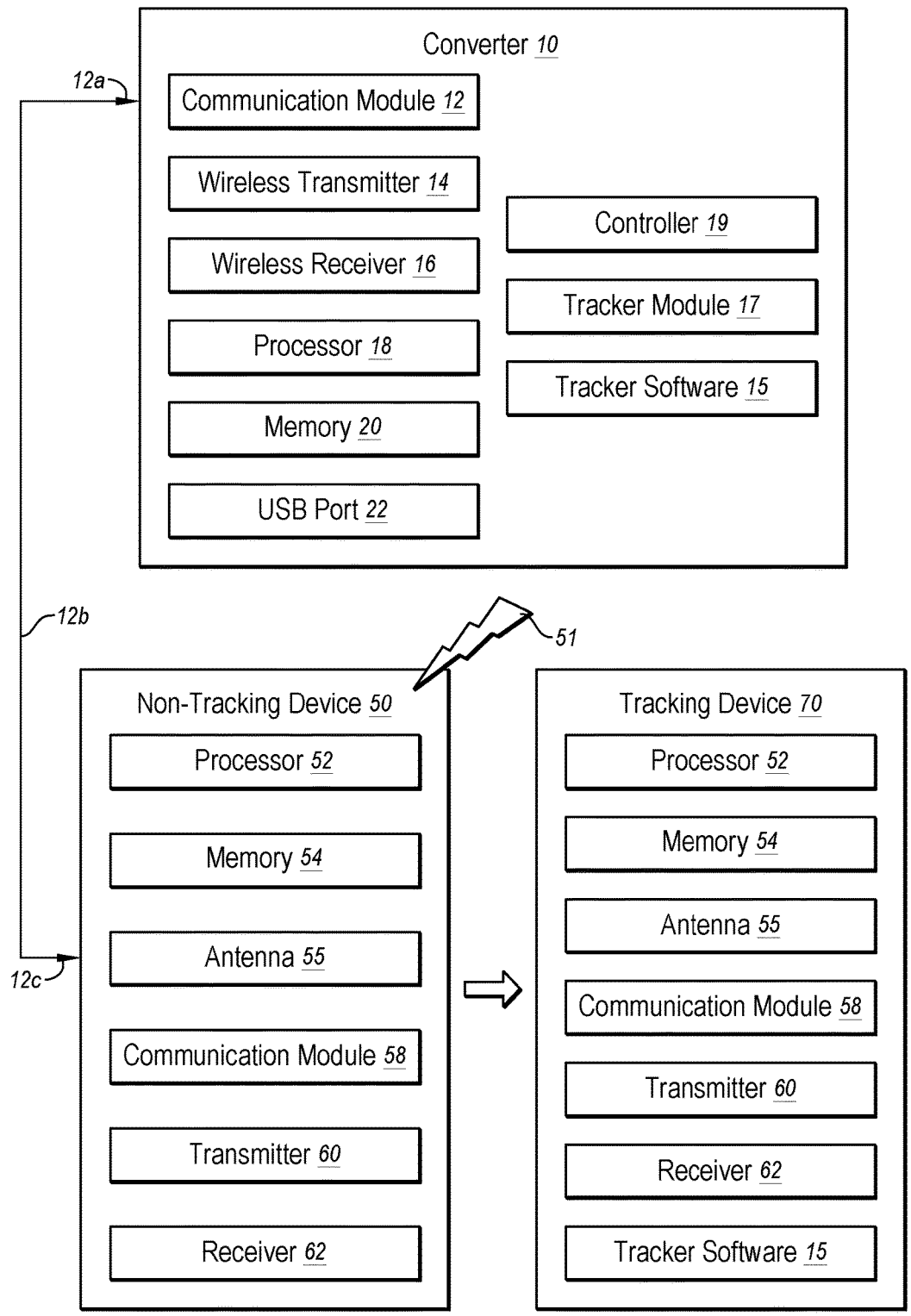
FIG. 1 illustrates a schematic view of an example embodiment of a converter device, a non-tracking device, and a tracking device.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the technology relates to converting a non-tracking device (e.g., electronic device) into a tracking device that can track and monitor a personal device or any signal emitting device transit (e.g., movement of the personal device) to obtain personal device transit data and data from the signal emitting device. While the non-tracking devices described herein are converted to tracking devices, these converted tracking devices can perform their original functions and also perform other functions with tracking software, such as monitoring, listening, and performing other operations to obtain personal device data from personal devices. The technology also relates to a tracking system having a plurality of converted tracking devices communicatively coupled through a network to a tracking server computing system that can receive and analyze the tracked transit data and tracked personal device data or any data that is obtained from a signal emitting device. The tracked transit data and/or tracked personal device data or other signal data can be analyzed through various data analytic protocols to identify information about the individual travelers and their contribution to the movement, transit, and location of people as well as their real time transit action and historical transit patterns. The transit can be related to any mode of transit, whether using a fuel or electricity powered vehicle or human powered vehicle or human foot transit, and the transit can be in any location (e.g., roads, walking areas, parks, schools, government buildings, sports venues, etc.).

It is advantageous to add additional functionalities to existing devices in order to for the existing devices to become tracking devices and also become part of the tracking network. This allows for computationally packaging more computational services into the same hardware device, and utilizing extra computing capacity to generate additional value and productivity. The updating of existing device software can add to the functionality without changing any structural features. Instead of only performing a manufacture-determined function, the updated electronic tracking devices further perform tracking functions, such as those described herein.

In one embodiment, the technology includes a converter device that has a means for communicating with a non-tracking device, and may also have a memory device storing tracking software, or otherwise immediately transmits such tracking software data through a communication mechanism to a storage device. The converter device can communicatively interface with the non-tracking device so as to install the tracking software on a memory device of the non-tracking device to convert the non-tracking device to a converted tracking device. As such, the tracking software data may be saved on the memory device of the converter device or a computing system accessed by the converter device, and which tracking software data may be passed to the non-tracking device either through the converter device or under instruction from the converter device to provide the tracking software data to the non-tracking device.

In one embodiment, the technology includes an electronic device that has been converted from a non-tracking device to a converted tracking device via installation of tracking software that causes the non-tracking device to become a converted tracking device. The installation of the tracking software is performed at the location of the non-tracking device that is converted to a tracking device, and thereby referred to as a converted tracking device. The converted tracking device is configured to use existing hardware and optionally existing software supplemented with the tracking software to become a smart signal tracker that can track signal emitting devices that transit within a defined distance from the converted tracking device. The converted tracking device can include one or more signal detectors that can detect one or more types of signals from a signal emitting device that is stationary or in transit. The converted tracking device is capable of detecting, tracking and monitoring transit entities that have signal emitting devices (e.g., SEDs) that emit one or more types of signals that can be detected by the one or more signal detectors of the signal trackers. The SEDs can emit WiFi signals, Bluetooth signals, tire pressure monitoring sensor signals (e.g., TPMS signals, low frequency to UHF), radio frequency signals, Dedicated Short Range Communications (DSRC) signals and cellular signals, among other types of signals. However, the description of the technology will describe implementations that operate by detecting various signals as examples, but it should be recognized that the converted tracking device can be configured into a converted signal tracker outfitted with other types of signal detectors and may detect other types of signals. The converted tracking device receives data (e.g., transit data, SED data, etc.,) from the SEDs and transmits some or all of the data to a tracking server computing system.

FIG. 1 shows an example embodiment of a converter device 10 that can include a communication module 12. In one aspect, the communication module 12 is configured to transmit and to optionally receive data. The communication module 12 can be hardware and include software (e.g., firmware, etc.). The communication module 12 can include hardware that is coupled to a port adapted to receive a first end 12a of a communication adapter 12b, which communication adapter 12b includes a second end 12c that can be received into a communication port of a non-tracking device 50. However, the converter 10 may be configured for wireless communication (e.g., as indicated by signal 51) so that a physical port of the communication module 12 is optional. The converter 10 can include wireless transmitter 14 and/or a wireless receiver 16, which together can be a transceiver. The converter 10 can include a processor 18, such as a microprocessor to implement processor functions to process data, execute instructions, and perform other data processing actions of the converter 10. The processor 18 can be operably coupled with a controller 19 that can control the processor 18 and other functions of the converter 10.

The converter 10 can also include a memory 20 (e.g., tangible, non-transitory, etc.), which has processor-executable instructions stored thereon that when executed cause the converter to perform methods of converting a non-tracking device 50 into a tracking device. The converter 10 can include a tracker module 17, comprised of hardware and/or software, which causes the converter 10 to send tracker software to a non-tracking device 50. The converter 10 can include tracker software 15 stored on a memory device (e.g., tangible, non-transitory). The tracker module 17 can push the tracker software 15 onto the non-tracking device 50.

Optionally, the converter 10 can include a USB port 22 so that a USB memory device can be inserted therein, and receive the tracker software onto the USB memory device for transport and installation onto a non-tracking device 50. Accordingly, the tracker software 15 may include the software to cause the non-tracking device 50 to become a tracking device as well as the software to cause the tracking software to be uploaded onto the non-tracking device so that the non-tracking device is converted into a tracking device capable of performing tracking functions, such as the tracking functions described herein.

Here, the tracking device is the non-tracking device 50 with tracker software 15 loaded thereon. The non-tracking device 50 can include any electronic device that includes electronic computing components that can perform the task of signal tracking, and transmitting signal data over a network to a signal tracking system (e.g., tracking computing system). Accordingly, the converter 10 can be configured as a computer or computing system, or have components of a computer therein.

Accordingly, the converter 10 allows for the installation of tracking software 15 onto hardware electronic devices, such as routers, sensors or any device with a processor, memory, and antennas or the ability to add antennas or a device that may act as an antenna. Such tracking software turns the hardware electronic device into a converted tracking device. While routers, repeaters, and other electronic devices involved in communication protocols are described herein, the technology is not limited to converting these specific devices into tracking devices, and thereby, the non-tracking devices can be any type of device that can be converted into a tracking device. For example, the tracker software 15 may be installed onto mobile phones, a vehicle's computer system, parking meters, smart televisions, or other devices that have processors, memory and either having an antenna or capable of having an antenna installed thereon.

In one embodiment, the converter is a memory device (e.g., memory stick, USB memory device, etc.) that includes the tracker software thereon. In this embodiment, the memory device is communicatively coupled with the non-tracking device such that the processor of the non-tracking device causes the tracker software to be uploaded onto the non-tracking device for conversion into a tracking device having the tracker software.

FIG. 1 also shows the non-tracking device 50, which can include a processor 52 (e.g., microprocessor), memory 54 (e.g., tangible, non-transitory), an antenna 55 (or ability to have an antenna installed), communication module 58 for communication with a network (e.g., to communicate with a tracking computing system), a transmitter 60 and a receiver 62. Accordingly, the non-tracking device 50 can be configured as a computer or computing system, or have components of a computer therein. The tracking device 70 is the non-tracking device having the tracker software 15 stored in a memory 54 thereof. It should be recognized that the memory 54 having the tracker software 15 can be any type of memory in a device that can be executed to perform the tracking function.

Figure 2:
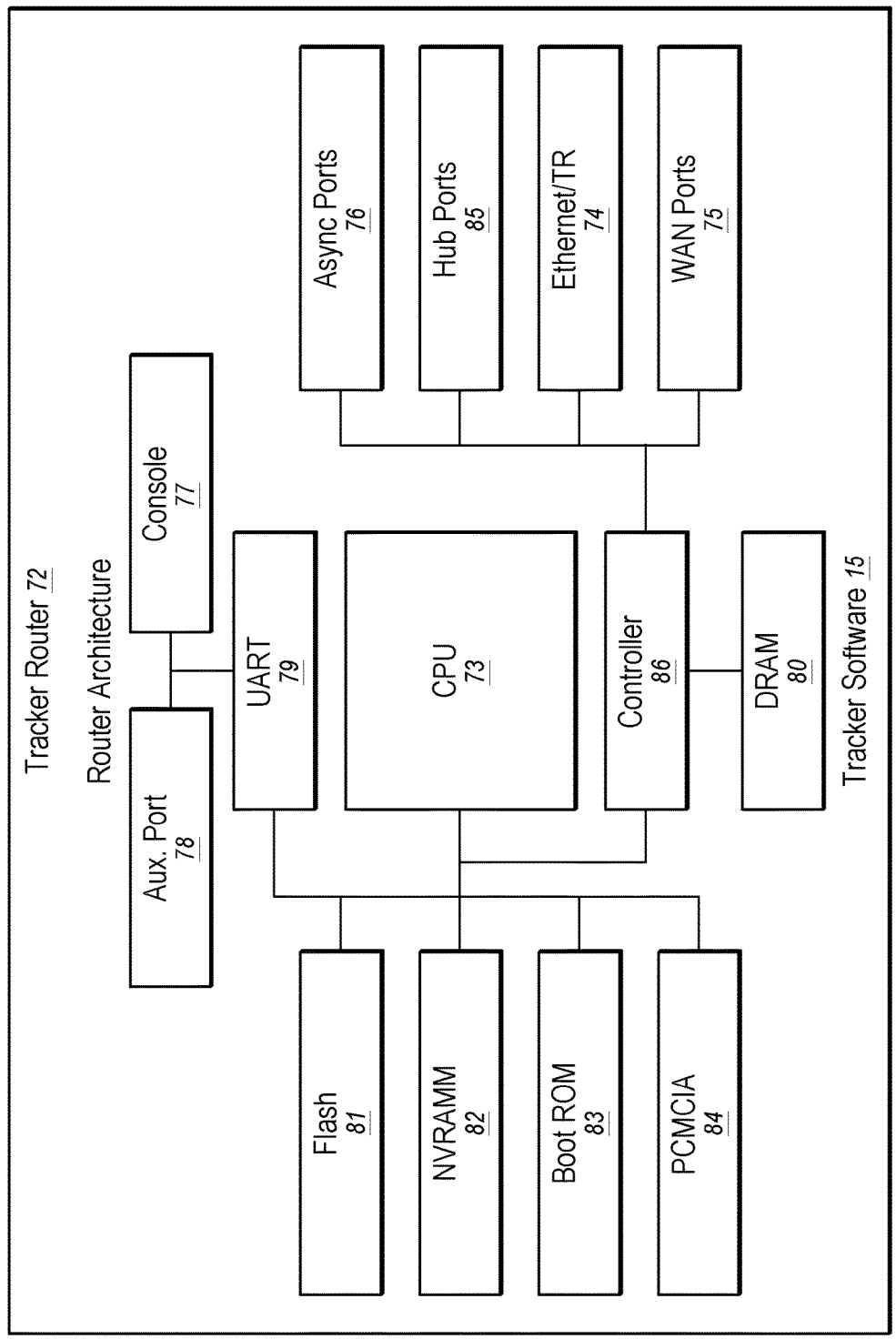
FIG. 2 illustrates a schematic view of an example embodiment of a tracker router.

FIG. 2 shows a tracker router 72, which is a standard router having the tracker software 15 stored in memory. The tracker router 72 can include a CPU motherboard 73 with an onboard LAN (Ethernet/TokenRing) 74, multiple WAN ports 75, and a single power supply. The tracker router 72 can include an AUI connector used for Ethernet ports. These ports are designed for connecting to an external transceiver that converts to a specific media type such as twisted pair, coaxial, or fiber. The transceiver may be connected to the AUI port either directly or through an AUI Cable. The console port 77 and the auxiliary port 78 are asynchronous serial ports. They provide an out-of-band method for managing the device by providing an access to Command Line Interface (CLI) without affecting the traffic that is flowing through the device. Rollover cable is used for connecting these ports with the external devices like PC (or terminal) and modem. The console port 77 is connected to the COM port of the PC (or terminal) and the auxiliary port 78 is connected to the modem. The console port 77 is configured as data communications equipment (DCE), and the auxiliary port 78 is configured as data terminal equipment (DTE).

Serial ports can be used for connecting to synchronous serial interfaces. DB-60 is a connector used for connecting these synchronous serial interfaces to Cisco routers. An RBI port can be used for connecting to an asynchronous BRI interface. RJ-45 is the connector used for the ISDN BRI connection. The CPU can be any CPU, such as Motorola 68030 CISC. The following are example characteristics of the CPU: 32 bit bus, 20 MHz clock (25 MHz on some platforms); 256 Bytes internal Data Cache, 256 Bytes internal Instruction Cache, both direct mapped. System Control Logic 86 is used to help the main processor with device control, interrupt handling, counting and timing, data transfer, minimal First In, First Out (FIFO) buffering, and communication with network interfaces and Dynamic RAM (DRAM).

The CPU 73 use buses to access various components of the system. In addition, buses are used for transferring instructions and data to or from specified memory addresses. A system bus allows communication with Ethernet or Token Ring controllers, WAN port interfaces, and etc. A Dual Universal Asynchronous Receiver-Transmitter (UART) 79 provides a user interface. It has one RS232 port, Data Communications Equipment (DCE) (for Console port 77) RJ45, and Data Terminal Equipment (DTE) (for the auxiliary port 78) RJ45.

The DRAM 80 has Main Processor Memory and Shared Input/Output (I/O) memory. Main Processor Memory is used for routing tables, fast switching cache, running configuration, and so on. It can take unused shared I/O memory, if needed. Shared I/O memory is used for temporary storage of packets in system buffers. Flash 81 is a permanent storage for the IOS software image, backup configurations, and any other files. IOS software is run from the flash memory, these image files are defined as relocatable, because the IOS software image can be executed from different locations in the Flash. NVRAM 82 is a Not-Volatile RAM used as permanent storage of the startup configuration. This memory is writeable, and can have various sizes, such as 32 KB.

The Boot ROM 83 refers to erasable programmable read-only memory (EPROM) and is used to permanently store the startup diagnostic code (ROM Monitor), and RxBoot. An example Boot ROM size is 2 MB. The PCM-CIA card 84 is a memory or I/O device that connects to a personal computer, usually a notebook or laptop computer. The hub ports 85 can be USB ports. The async ports 76 include ports where the terminal or comm server commonly provides out-of-band access for multiple devices. A terminal server is a router with multiple, low speed, asynchronous ports that are connected to other serial devices, for example, modems or console ports on routers or switches.

The tracker router 72 can also include firmware, which can be a computer program that is "embedded" in a hardware device and is an essential part of the hardware. It is sometimes called embedded software. An example is a microcontroller, a part of the microprocessor that tells the microprocessor what actions to take. The tracker software 15 can be located on any of the available memory devices of the tracker router 72, such as in the flash 81. The firmware on the flash 81 may be retained or modified with the tracker software 15 so that the tracker router 72 functions as a router and as a converted tracking device.

In one embodiment, the converter and methods of use allow for the ability to turn existing devices, such as infrastructure devices, traffic control devices, parking devices, communication devices, routers, modems, or other electronic devices that have hardware for detecting signals, obtaining data of the detected signal, and transmitting the data from the detected signal to a tracking server computing system or otherwise performing the tracking methods described herein by running the tracker software, into converted tracking devices.

In some configurations, the converted tracking device can function the same as a dedicated tracking device. Accordingly, these existing electronic devices can be converted by software and optionally by addition of some hardware (e.g., antenna) into a sensor to collect data from SEDs in order to obtain data regarding passing devices, people, objects or vehicles. The converter and tracker software allows for the creation of a tracking device (e.g., "digital sensor") without the need to deploy dedicated tracking devices as has been required previously. The disclosed embodiments allow for software to update an existing device to perform its original functions and to have the additional function of tracking. The existing device with the proper hardware can be updated with the tracking software to have the additional functionality or usefulness of tracking as described herein.

In one embodiment, the present technology provides for a software development kit (SDK) that allows for development of tracking applications and tracking software for specific device types to make that specific device type into a converted tracking device. The specific device type may have the required hardware and memory for retaining (non-transitory) the tracking software and ability to have an antenna or have an antenna coupled therewith in order to provide the functions described herein. The SDK described herein allows for modulating the tracking software for application to a broad range of specific devices.

In one embodiment, the tracking software can be installed on devices that have PCBs with memory and hardware that can receive signals from SEDs. This converts the devices into a signal tracker (e.g., tracking device) or a signal sensor that enables that device to collect various types of signals (e.g., cellular, WiFi, Bluetooth, TPMS or other signals) from electronics, people, and devices as they pass by the tracking device.

In an example, the tracking software may be installed onto a router to enable the router to detect WiFi signals and to collect the data of the detected WiFi signals (e.g., collect a WiFi MAC address) from passing devices. In this example, the software is installed on the router to alter the firmware of the router in order to allow the router to passively detect devices (e.g., SED) that are emitting signals and obtain the data for the SED. This provides a tracking function to the router, rather than the router just actively making connections with devices. Routers often possess Bluetooth antennas, or USB ports that would allow a Bluetooth antenna (or any other type of antenna) to be plugged in and installed to the router. For example, a pluggable antenna for sensing TPMS data can be installed on the router (or other converted tracking device) to allow for detecting the TPMS signal and obtaining the TPMS data. In another example, a pluggable antenna for sensing DSRC signals can be installed on the router (or other converted tracking device) to allow for detecting the DSRC signals and obtaining DSRC data. Also, pluggable devices with other functions may be plugged into a port of the converted device (e.g., converted tracking device) and can include other modules to collect additional information; which, for the purposes of illustration, may include things, such as atmospheric sensors, thermometers, Doppler radar modules, software defined radios or others.

In another example, the tracking software may be installed onto signal repeaters to convert the signal repeaters into converted tracking devices to provide the tracking functions described herein. The signal repeater in this example is part of a parking stall sensor system, where the individual parking stall meters send signals to the repeater for propagating the signal to a data collector (e.g., parking stall meter system), which results in the converted signal repeater collecting data from parking stall sensors. These signal repeaters are mesh networked or run on cellular or ethernet connections, and the signal repeaters have a PCB with a processor and memory which obtains, retains, and operates the tracking software in order to collects the data and then transmit the collected data back to a tracking server computing system.

For example, the present technology provides the ability to install software on routers at a university and then to track translocation of SEDs throughout the university. As such, the data from the SEDs can be analyzed in order to better understand building utilization, occupancy and the impact of events at the university. Previously, it would have cost prohibitively to install dedicated tracking devices throughout a university for such a university-wide tracking system.

In one aspect, the updating of existing devices into converted tracking devices can increase the spread and density of signal tracking devices. Instead of creating dedicated tracking devices and installing them, the present technology allows for electronic devices that are in set locations as well as translocatable devices to be converted to converted tracking devices in order to increase the density of tracking devices. This can reduce or eliminate the need for new or additional dedicated tracking devices to be deployed in order to collect data embedded on the signals that are tracked and monitored.

Figure 3A:
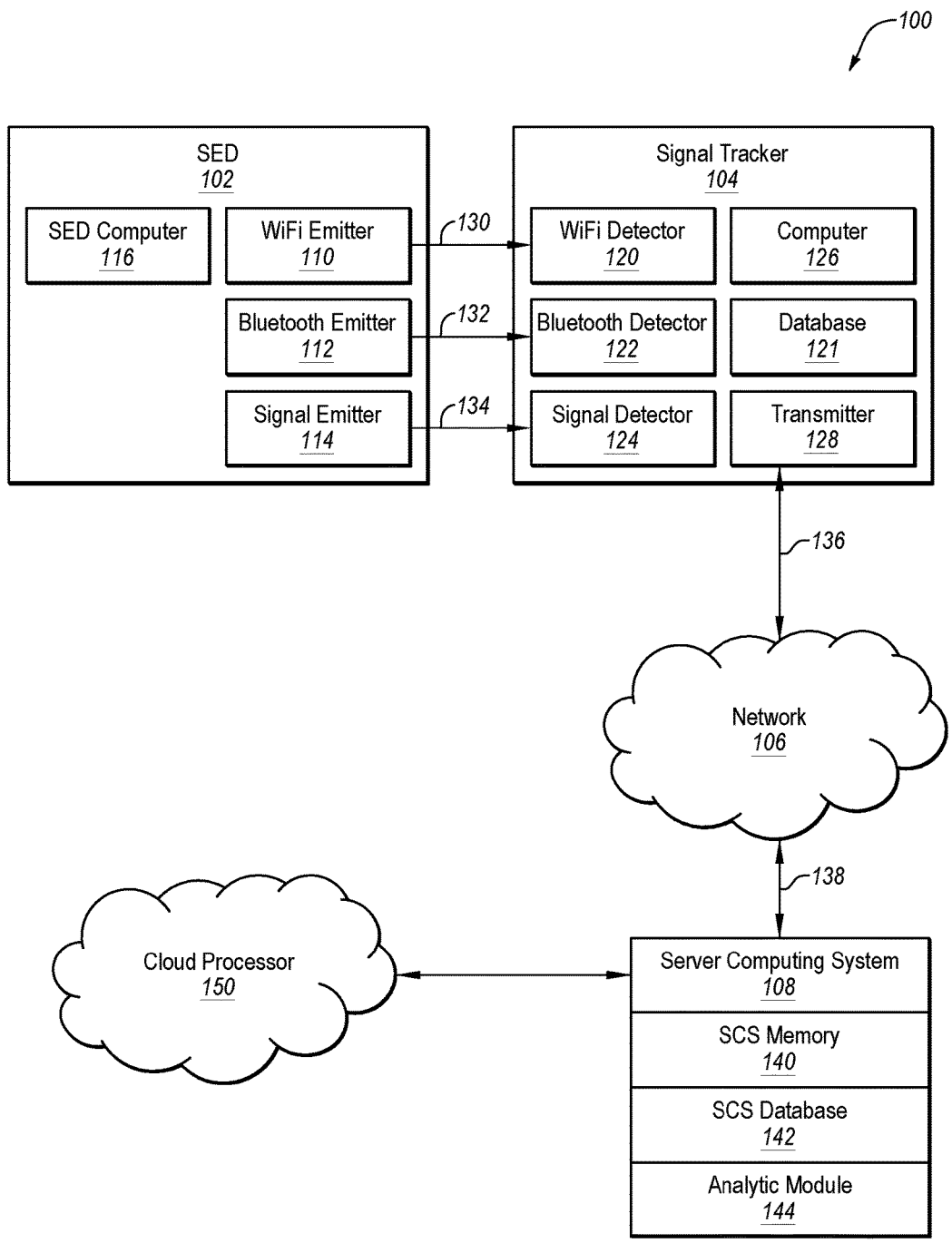
FIG. 3A illustrates a schematic view of an example embodiment of a tracking system.

FIG. 3A shows an embodiment of a tracking system 100 that includes an SED 102, signal tracker 104 (e.g., tracking device, such as a converted tracking device), network 106, and tracker server computing system 108. The SED 102 is shown to have: a WiFi emitter 110 that is configured to emit a WiFi signal 130, such as when the SED 102 is searching for a WiFi network to join; a Bluetooth emitter 112 that is configured to emit a Bluetooth signal 132, such as when the SED 102 is searching for a Bluetooth network; and a generic signal (e.g., cellular, TPMS, DSRC, etc.) emitter 114 that is configured to emit a signal 134 (e.g., cellular signal, TPMS signal, DSRC signal etc.), such as when the SED 102 is emitting signals searching for a cellular network or emitting signals that can be received.

Correspondingly, the signal tracker 104 is shown to have a WiFi detector 120 that is configured to detect a WiFi signal 130, such as a WiFi signal from an SED 102 that is searching for a WiFi network to join; a Bluetooth detector 122 that is configured to detect a Bluetooth signal 132, such as a Bluetooth signal from an SED 102 that is searching for a Bluetooth network to join; and a signal detector 124 that is configured to detect a signal 134 (e.g., cellular TPMS, or DSRC), such as a cellular signal from an SED 102 that is searching for a cellular network to join or TPMS signal from a tire pressure sensor to a tire pressure monitoring system in a vehicle computer system.

The SED 102 can include an SED computer 116 (e.g., includes computing components such as FIG. 6) that provides SED data to the WiFi emitter 110, Bluetooth emitter 112, and/or generic signal emitter 114, where such data is embedded in the signals (e.g., WiFi signal 130, Bluetooth signal 132, and/or generic signal 134) and the data content of such signals is well known in the art.

The signal tracker 104 can include a signal tracker computer 126 (e.g., includes computing components, such as in FIGS. 1, 2, and 6) that receives data for the detected WiFi signal 130, Bluetooth signal 132, and/or generic signal 134 received from the SED 102, and performs any function with the data as described herein, which includes providing the data through a network 106 to a tracking server computing system 108), and may or may not include data processing.

The signal tracker 104 also includes a signal tracker transmitter 128 (e.g., transceiver) that can transmit a signal tracker signal 136 having signal tracker data to the network 106. The network 106 can then pass the signal tracker data to the tracking server computing system (SCS) 108 through a network signal 138. The tracking server computing system 108 can perform the data analytics described herein. The transmitter 128 may also be able to transmit data to the SED 102.

Figure 3B:
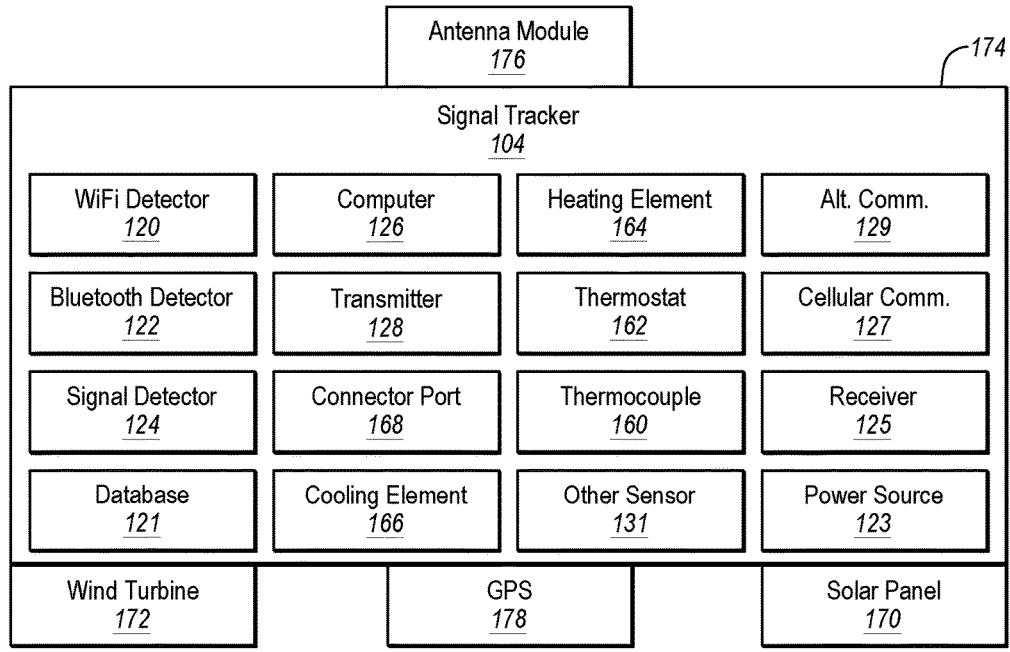
FIG. 3B illustrates a schematic view of an example embodiment of a signal tracker of the tracking system of FIG. 3A.

In one example, the signal tracker 104 collects Wi-Fi signals 130 and/or Bluetooth signals 132 (e.g., Bluetooth being "BT") and/or any other signals 134, and obtains data from the collection of such signals, where such data can include for example MAC address, signal strength, time, and location from the SED 102. The collected data is then consolidated onboard the signal tracker 104, such as in the signal tracker computer 126, or such as in a signal tracker database 121 (FIG. 3B).

The signal tracker computer 126 may process the collected data to obtain relevant data and to exclude irrelevant data that is removed from the collected data. The removed data may be retained in the signal tracker database 121, or it can be purged. The data is then transmitted to the SCS 108 via the network 106, which can be a real time data transfer, or the data can be batched by the signal tracker computer 126 and uploaded to the SCS 108 in a batch mode.

The SCS 108 can receive the uploaded data from the signal tracker 104 and temporarily save the data in a SCS memory 140 for later insertion into the SCS database 142. The upload process (e.g., background upload process) can pick up the data in any order (e.g., sequentially, level of importance, or marked data) and insert the data into the SCS database 142. The SCS 108 includes an analytic module 144 that can analyze the data in various analytical protocols, or it can transmit the data to a cloud processor 150 for performing the analytics. The analytic module 144 can implement analytic processing of the data, and then periodically update analytics either on a processor associated with the analytic module 144 or via cloud-computing servers (e.g., cloud processor 150).

The data analysis can include the MAC address of the SED 102 being classified into: device type based on manufacturer, model, and other specifications for later use. The transit data including the unique MAC address, time detected by the signal tracker 104, and signal strength received from the signal tracker 104 can be used in the data analytics.

In one example, a single SED 102 can emit multiple signals (e.g., WiFi, BT, cellular, or other) that can be detected by the signal tracker 104. However, a mobile entity, such as a vehicle (e.g., car, truck, bus, bicycle, skates, skateboard, skis, etc.) can include one or more unique persons, and each person can include one or more unique SEDs 102 as well as the TPMS system emitting a TPMS signal. Accordingly, a mobile entity may have more than one SED 102 being detected simultaneously by the signal tracker 104, and the data thereof provided to the SCS 108. The one or more SEDs 102 within the same mobile entity can be filtered, controlled for and adjusted directly on the signal tracker computer 126, SCS 108, and/or cloud processor 150. The unique aspects of the TPMS signal can allow for the TPMS signal to be identified and matched to a vehicle, which allows for the other SEDs 102 to be identified as mobile devices or other SED.

The signal tracker 104 can generate data or receive data from the SCS 108 or cloud processor 150, and either take an action or relay information back to the SCS 108 or cloud processor 150. The signal tracker 104 can relay a data signal directly to other electronic or mechanical equipment (e.g., examples include but are not limited to transit lights, street lights, billboards, monitors and mobile applications) or other signal trackers 104 (e.g., converted or dedicated tracking devices), and such electronic or mechanical equipment may implement an operation or change an operation in response to the data on the data signal.

The signal tracker 104 (e.g., converted tracking device) is described in more detail herein and in reference to FIG. 3B. Generally, the signal tracker 104 can include a signal tracker computer 126, which can include aspects of any common computer, such as exemplified by FIG. 6. The tracker software can be uploaded onto the computer 126 and then stored on a non-transient, tangible storage media, such as any memory device. The signal tracker computer 126 can include a processor that operates as any computing processor to perform the tracking function of the tracker software.

The components of the signal tracker 104 may be connected together and operate as understood by one of ordinary skill in the art. The signal tracker 104 can have a power source (e.g., battery or 110 V or 220 V or any other) 123 or receive power from an outside source, which is standard for an electronic device that can be converted to a converted tracking device. The power is provided to each component of the signal tracker 104 either by channeling power through the individual components or by using cables, wires or other means to provide the needed power to each component. This can be accomplished by using a USB-hub or similar device to facilitate power transfer.

The signal tracker computer 126 can include circuitry for operation of the signal tracker 104 to perform the tracking function of the tracking software. The circuitry can be used for capturing: WiFi MAC addresses or the like and associated data such as signal strength and time the signal was first captured and duration of time the signal is detected, Bluetooth address (e.g., BD_ADDR) or MAC address and associated data such as signal strength and time the signal was first captured and duration of time the signal is detected, and any other signal, such as TPMS data or cellular pseudonoise code (e.g., PN code) or MAC address and associated data such as signal strength and time the signal was first captured and duration of time the signal is detected. However, other signals from the WiFi, Bluetooth, or other signal emitter with other information may also be used.

The signal tracker 104 can use the identification of the WiFi, Bluetooth, and/or other signal modules, or it can group two or more of these identifiers together and/or create an identification number for the SED 102 based on one, two, or three of the WiFi, Bluetooth, and/or cellular identifiers, or TPMS identifiers, or other signal identifiers. This allows each unique SED 102 to be identified and tracked separately. The signals from the SED 102 can act as a fingerprint that can be tracked by the signal tracker 104.

The signal tracker 104 can have a signal tracker transmitter 128 that includes the electronics, hardware, software, and antennae to transmit data, such as to the network 106 or other signal trackers 104 or SEDs 102. The signal tracker 104 can have a signal tracker receiver 125 that includes the electronics, hardware, software, and antennae to receive data from the network 106 or other signal trackers 104 or SEDs 102. The transmitter 128 and receiver 125 can be combined into a transceiver. Also, the antenna module 176 can be operated with the transmitter 128 and/or receiver 125. The signal tracker 104 can communicate with the network 106 or other signal trackers 104 or SEDs 102 in any possible way or combination of ways. In one way, the communication can be via Bluetooth Low Energy. In another way, the communication can be via any communication mode, Ethernet, WiFi, 3-4G or GSM or the like.

The signal tracker 104 can include a WiFi detector 120 that has one, two or three or more WiFi antennas, which can be part of the WiFi detector 120 or part of the antenna module 176. With the tracking software, the WiFi detector 120 can gather WiFi data to passively gather MAC addresses and other data (e.g., signal strength and signal detection duration and/or time) from any SED in proximity to the signal tracker 104. The WiFi detector 120 may be configured to transmit data via WiFi, such as to the SED 102, or to send/receive data with the SCS 108 or cloud processor 150. The signal tracker 104 or WiFi detector 120 may use externally or internally mounted directional or omni-directional antennas, which may be part of the antenna module 176. The WiFi detector 120 may be configured as a WiFi module for WiFi operation and processing.

The signal tracker 104 can include a Bluetooth detector 122 that can perform a Bluetooth gathering function and a Bluetooth transmission function with the tracking software. The Bluetooth gathering function can use the device/antenna that gathers Bluetooth MAC addresses and signal strength as well as other Bluetooth data. The Bluetooth transmission function can use a Bluetooth module or built in Bluetooth to transmit a message or short code to devices (e.g., SEDs) in its range that have identified themselves as looking to receive information from a mobile APP or partner APPs. The Bluetooth detector 122 may be compatible or not compatible with an "iSignal tracker" protocol and other similar protocol often referred to as "BLE". The Bluetooth detector 122 may use externally or internally mounted directional or omni-directional antennas.

The signal tracker 104 can include a generic signal detector 124 that can perform gathering functions and/or transmission functions as described herein for one or more different types of signals, which includes cellular signals, TPMS signals, DSRC signals as well as other signals. That is, the signal detector 124 can detect a signal and obtain identification information as well as other data as described herein. The signal detector 124 can use externally or internally mounted directional or omni-directional antennas (e.g., antenna module 176). The tracker software can operate the signal detector 124 for the signal detecting and tracking functions described herein.

The signal tracker 104 may also include a cellular communicator 127 that can be implemented similar to a cellular phone to send and/or receive data, such as with the network 106, SCS 108, or cloud processor 150. The cellular communicator 127 can use cellular signals (e.g., 2G/3G/GSM or other) to send/receive data. The cellular communicator 127 can use externally or internally mounted directional or omni-directional antennas (e.g., antenna module 176). The tracker software can be configured to use the cellular communicator 127 for communication functions as described herein.

The signal tracker 104 may also include an alternative communicator 129, which can be a transmitter, receiver, and/or transceiver so as to allow for alternative send/receive options. The alternative communicator 129 can use undefined/defined radio spectrum, such as specifically the ability to easily plug in a module that transmits and/or receives signals using any type of communication (e.g., microwave signals). The alternative communicator 129 may use externally or internally mounted directional or omni-directional antennas (e.g., antenna module 176). The tracker software can be configured to use the alternative communicator 129 for communication functions as described herein.

The signal tracker 104 can store data internally in the signal tracker database 121 or other memory device, which stored data is either encrypted or not encrypted. The signal tracker computer 126 can filter the data for unwanted or wanted types of data and/or signals based on the type of signal, the strength of the signal, the type of SED, model of SED, or time the SED comes into or goes out of range of the signal tracker as well as the duration the SED is within range. Here, the tracker software can configure a memory device to be used as a database 121.

The signal tracker computer 126 can include a processor capable of running embedded Linux or other operating systems, and can perform calculations, process data, and execute commands for controlling all connected components of the signal tracker 104 and perform the signal tracker functions of the tracker software, while also being able to create a mesh network between signal trackers 104 in appropriate proximity. The signal tracker computer 126 can include on board memory that is sized appropriately, such as appropriately sized RAM, external/removable memory such as having the capability to attach a 128 GB micro-SD or SD card or other portable memory device. The signal tracker computer 126 can include a user interface or be pluggable to a user interface, which provides the ability to directly or remotely control and upgrade software via WiFi, 3-4G or GSM. This can allow for a non-tracking device to be converted to a converted tracking device by uploading the tracker software and execution of the tracker software code.

The signal tracker 104 can include components for environmental management so that the signal tracker can operate at cold and hot temperatures commonly found in the environment of use. Such components can include a thermocouple 160, thermostat 162, heating element 164, and cooling element 166. The components for environmental management can use the thermocouple 160 as an on board temperature monitor and the thermostat 162 can be used for controlling the heating element 164 and/or cooling element 166 in response to the temperature provided by the thermocouple 160. The thermostat 162 may be preprogrammed for temperature regulation or it may be controlled by the SCS 108 or cloud processor 150. A number of thermocouples 160 can measure temperatures inside and/or outside of the signal tracker 104. Also, external heating capabilities can be provided by a connected solar panel 170 or wind turbine 172, which can be controlled by the thermostat 162.

The signal tracker 104 can include various external connector ports 168, which can be configured to receive any type of pluggable, such as for data communication with a separate device or a network. Examples can include Ethernet ports, I2C, USB, SPI interface, or the like, and any number of external connector ports 168 can be included. Also, the signal tracker 104 can include other sensors 131, such as those that can sense the environmental conditions around the signal tracker 104, where a weather sensor is an example. These ports may be used to connect to a converter (FIG. 1) in order to upload the tracker software from the converter to convert a non-tracking device to a converted tracking device.

The signal tracker 104 can be operated by any type of power source 123, such as being capable of accepting, for example, a +5V signal, through a micro-USB from a 110-120 V converter or a 12 V converter from either solar panels or batteries or any pluggable or hardwired power source. The signal tracker 104 can monitor power usage over time by recording and reporting data on power consumption and transmitting such data to the SCS 108, such as via WiFi, 3-4G or GSM.

The power source 123 may include a battery system that can be run off of harvested energy that is sufficient to run the signal tracker 104. The power source 123 may up or down convert power for compatibility with other elements of the signal tracker 104. The power source can provide power or battery management, so that it provides a minimum voltage of 5V up to 24V, and may be at 2 A, such as from a harvesting source (e.g., solar panel 170 or wind turbine 172, or other natural power harvesting component). The power source 123 can use or connect to rechargeable batteries (e.g., LiFo, Nickel, Cadmium, etc.), which batteries can be interchangeable. The power source 123 can use a defined voltage of batteries to plug into a power board. The power source 123 can be unregulated 5V to 24V and up to 2 A. Power can be from two sources simultaneously (e.g. wind and solar). The power source 123 can also be regulated 5V to 24V power up to 2 A, which may be obtained via USB or other cable and or protocol. The power source may be hard wired or plugged into a standard outlet or custom outlet.

A powered heat cable can also be included, which is a connection to a mask/material that runs behind an external solar panel to heat an element in snow/cold weather situations. A case 174 can be used to house the signal tracker 104 and components thereof, which may have an integrated or removable solar panel 170 or wind turbine 172. The solar panel 170 and/or wind turbine 172 can be attached to the case 174 so that either can be removed or can pivot, automatically or via manual adjustment, towards the sunlight or wind, and have the ability to be removed if not needed. The case 174 can be configured to be able to withstand summer and winter weather conditions in harsh areas such as ski resorts or deserts, low temperatures (−20° F.), and high temperatures (125° F.). The case 174 can be shock resistant to protect from falls, such as from a height greater than 10 ft. The case 174 can include antenna module 176 so as to be easily mountable and installable in almost any environment (e.g., trees, concrete walls, poles, round or square surfaces or objects).

It should be recognized that if an electronic device does not include one or more of the components of FIG. 3B, such components may be added to or coupled thereto. For example, routers, repeaters, and other similar devices have ports that can receive pluggable components, and such pluggable components can be any of the components of FIG. 3B.

Figure 3C:
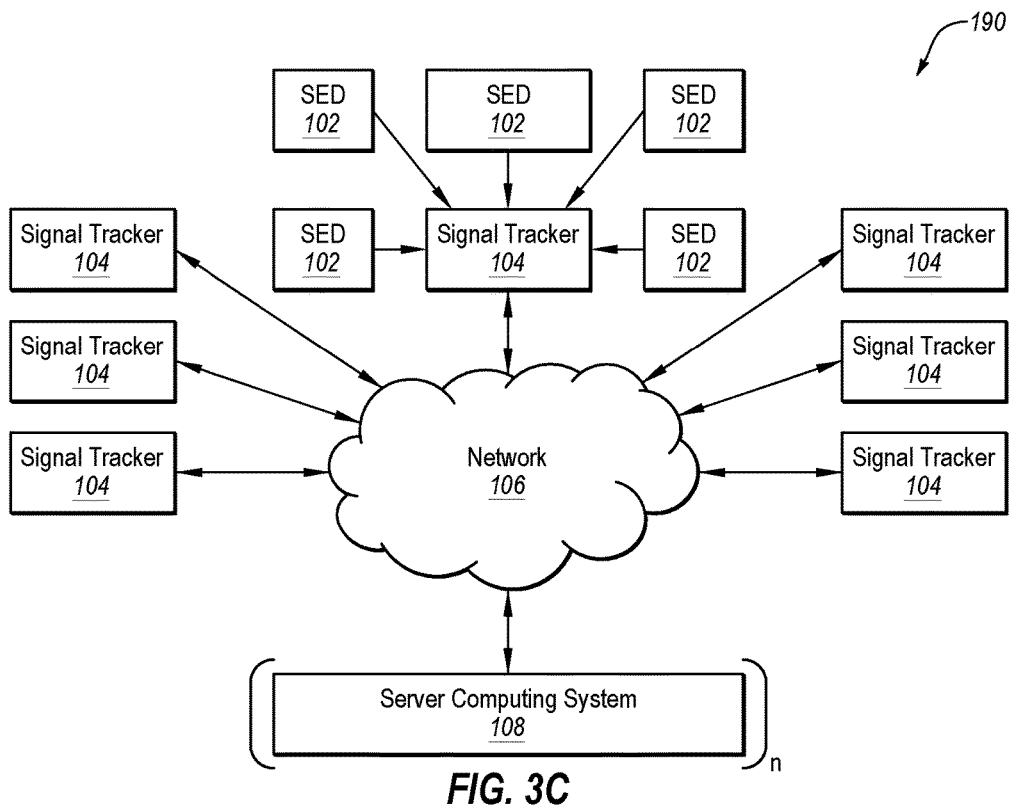
FIG. 3C illustrates a schematic view of an example embodiment of a transit monitoring and analysis system.

FIG. 3C shows an example embodiment of a transit monitoring and analysis system 190 that includes a plurality of SEDs 102 in proximity with a signal tracker 104 (e.g., converted tracking device), and a plurality of signal trackers 104 (e.g., one or more converted signal tracking devices) communicatively coupled through a network 106 to an SCS 108. While only one SCS 108 is shown, such SCS 108 may include multiple computers, or be at multiple locations, and generally function as a cloud processor 150. As such, there may be "n" SCS 108s in the system 190, where "n" is any integer.

The signal tracker 104 (e.g., converted tracking device) can be utilized by passive signal monitoring of an SED, such as WiFi, BT, cellular, TPMS, DSRC, generic signal, or other signal monitoring. The data obtained from such monitoring can be obtained by the signal tracker 104 having the tracker software, and then consolidated and uploaded to a server, such as the SCS 108. The SCS 108 can process the data to obtain information such as MAC address or other unique SED identifier as well as data regarding the SED 102 entering a signal tracker zone around the signal tracker 104 where the SED 102 can be detected, such as the time of first detection, time of last detection, duration of time residing in the signal tracker zone, as well as any other data provided by the signals emitted from the SED 102.

The SCS 108 can perform many calculations and make determinations regarding the SED being within the zone, such as rate of travel, direction of travel, road or transit routes, associated other SEDs located in proximity to one SED 102, groups of SEDs 102, singular SEDs 102 in packs (e.g., transit pack of different entities), or other information. This information can be obtained at each signal tracker 104, and the same SED 102 can be tracked at other signal trackers in the transit system, so that a complete transit pattern for one SED 102, a group of SEDs 102, or packs of singular SEDs 102 can be obtained for a given time period or travel period.

The information can be tracked in real time and computed, and the information can be tracked over a plurality of days, and an historical transit pattern can be obtained for the one or more SEDs 102. Based on historical transit and travel patterns for a single SED 102 or group of SEDs 102 or pack of individual SEDs 102, predictions for transit routes and travel patterns can be predicted for these SEDs 102. For example, based on historical tracking over days, weeks, or months, the routine or customary transit routes and travel patterns can be identified. For example, a person having an SED 102 may travel to work at a certain time or without a certain timeframe every weekday, and thereby such a common entry location and final destination for a travel route may provide an indication of where the person (e.g., SED 102) is originating from and where they are going in a routine, so that the routine of the SED 102 can be predicted.

The signal tracker system can obtain information for the transit monitoring system to make determinations of the travel routes and patterns of moving people into the city or into a metro area as well as moving within such areas. The data can be meshed with map data and location data so that the places the SEDs visit can be determined and analyzed. This allows for determinations of what the SED is doing, how the SEDs move to certain places, because the system is monitoring their location and transit pattern, whether in a vehicle and/or pedestrian.

The system is configured to track an SED, such as a phone, a tablet, a connected car, or any other SED that can be tracked as described herein. This allows the system to process data to identify one or more SEDs associated with a common person, and to associate a person with a group of people with a similar travel pattern, or common destination. The travel information for a particular SED or group of SEDs can be obtained at any rate of travel, and the rate of travel can indicate travel by car, bicycle, or pedestrian travel. The data can be processed and provided to an entity for targeting advertising based on an SED or group of SEDs with a common travel pattern that occurs repeatedly within certain timeframes of workdays or other times, where such data can be used for determining a certain advertisement to be presented on an electronic billboard at a certain time or over a certain timeframe. This allows the data to be used to predict when to advertise certain products that may be targeted to an SED or group of SEDs. This allows the signal tracker system to obtain data for an advertising system to better target the people who are passing the electronic advertisements.

The converted signal trackers can be created at any location where there is an existing electronic device, such as by installing the tracker software on the electronic device. The electronic device may be stationary (e.g., fixed location) or a portable electronic device with a GPS or other location determination means, so that the location of the converted signal tracker can be determined at the time a signal from an SED is detected. Accordingly, the signal tracker 104 of FIG. 3B shows the GPS module 178 that can perform GPS functions to identify the location of the signal tracker 104 when in transit, or before or after being moved. This allows the location of the signal tracker 104 to be identified when an SED signal is detected, and the GPS location data can be included with the data from the SED that is transmitted over the network 106 to the tracking server computing system 108.

The ability to install the tracker software onto existing devices can allow for an increase in signal trackers in a certain area to provide a higher density with fewer gaps between the signal trackers. As such, the electronic devices within certain destinations can be upgraded with the tracker software so that different areas of the destination can have converted signal trackers. Such destinations can be stores, restaurants, parks, stadiums, arenas, resorts, ski resorts, theaters, malls, parking facilities, shopping centers, golf courses, congregation centers, churches, schools, buildings, hospitals, recreation centers, gyms, event centers, offices, apartment/condo/townhouse complexes, neighborhoods (e.g., public and private), or any other destinations that include electronic devices that can be converted to converted tracking devices, and where SEDs congregate together, possibly at the same time, and sometimes for similar durations (e.g., for events). The movement within such destinations can be tracked by the converted tracking device with the tracking software as well as the duration of the SED staying still or in a defined location, such as a seat at a theater or stadium.

Figure 4A:
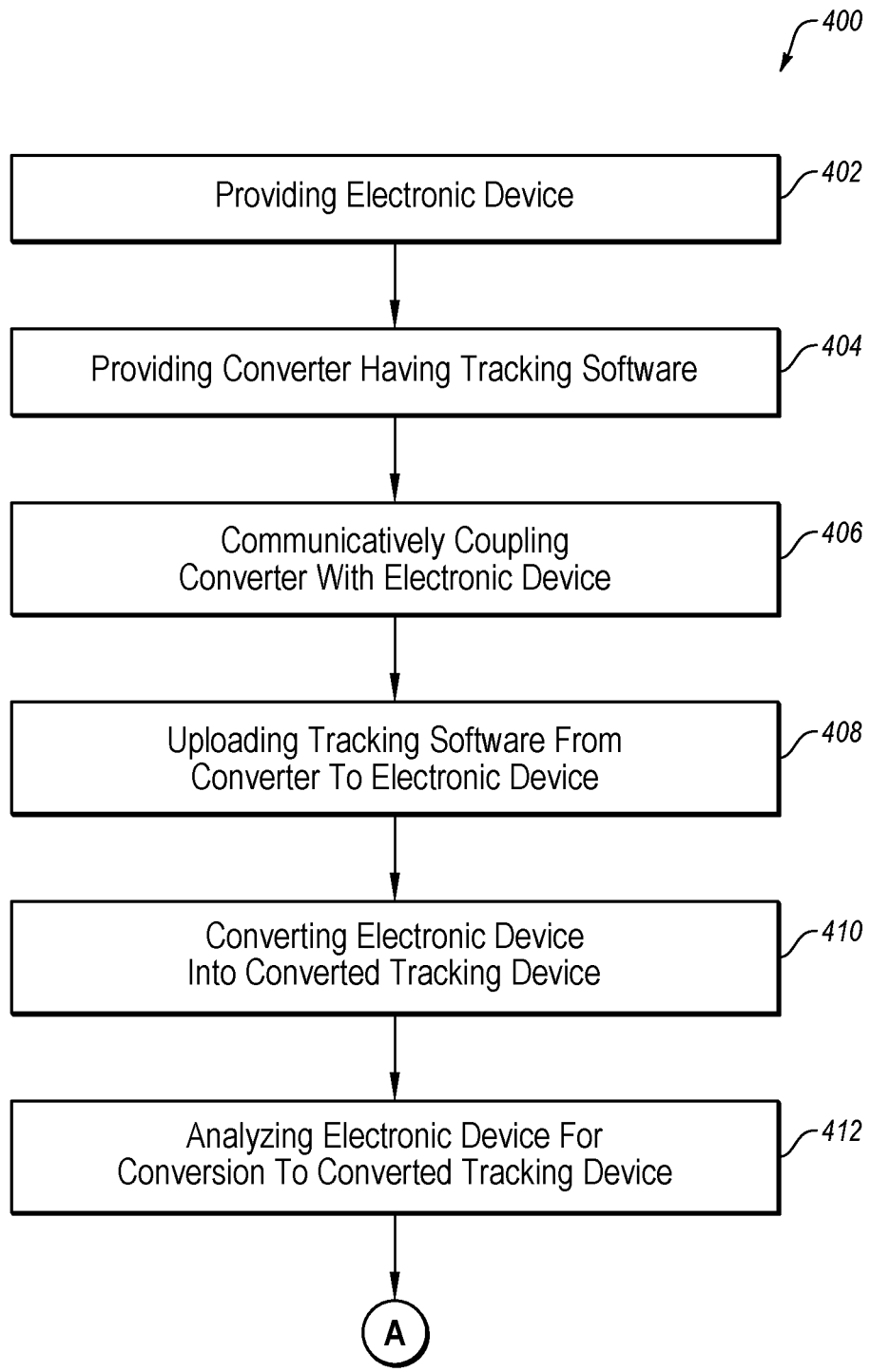
FIGS. 4A-4B illustrate an example method for converting an electronic device into a converted tracking device.
Figure 4B:
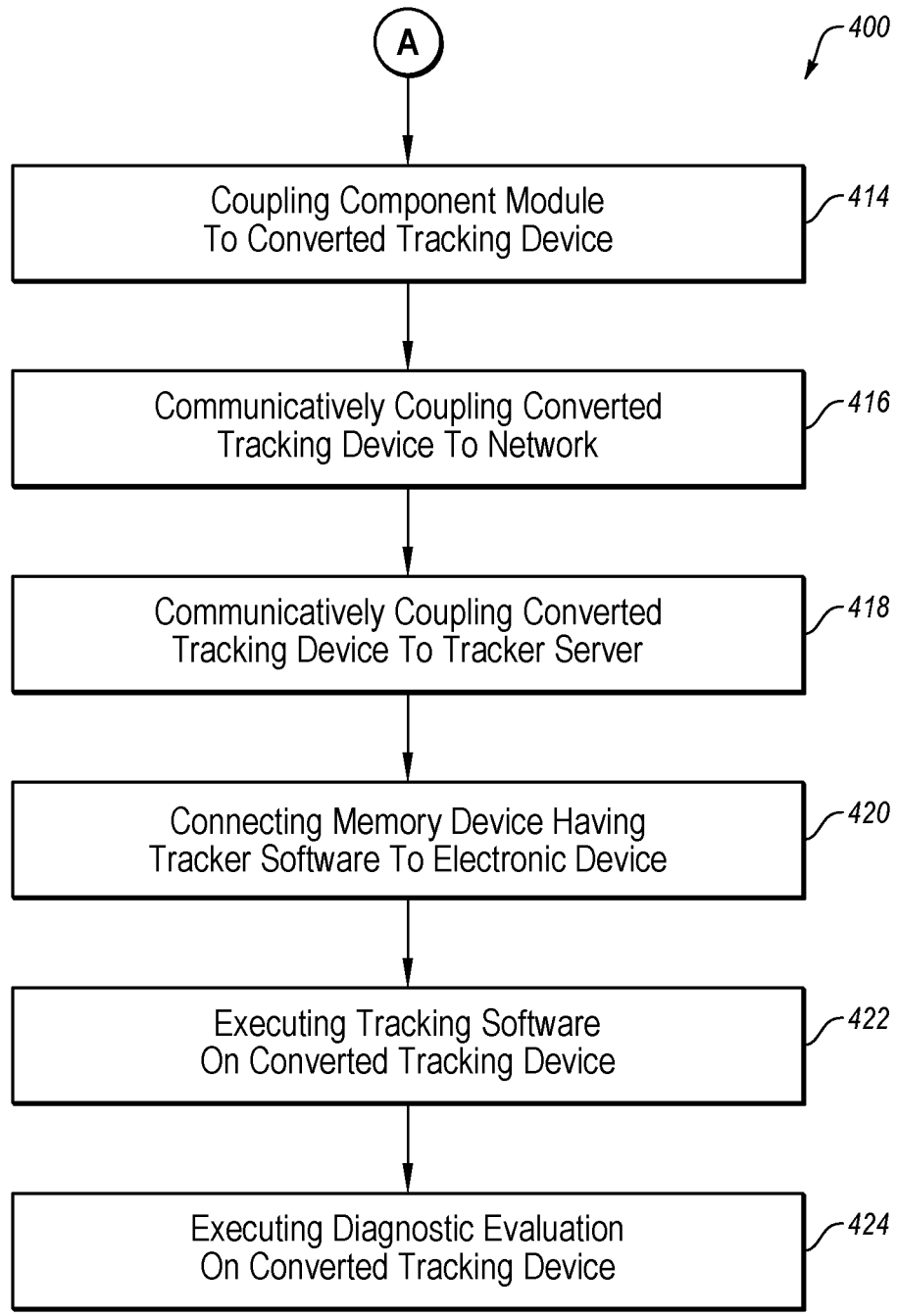

FIGS. 4A-4B illustrate a method 400 for converting an electronic device (e.g., non-tracking device) into a converted tracking device. The method 400 can include a step 402 of providing an electronic device, such as any electronic device that has the hardware and ability to receive, store, and execute the tracker software. The method 400 can include step 404 of providing a converter device having the tracking software. Step 406 includes communicatively coupling the converter with the electronic device, which communicatively coupling can be a data transmission cord (e.g., adapter) or wireless communication between the converter and the electronic device. Step 408 includes uploading the tracking software from the converter to the electronic device, such that the tracking software is loaded onto a memory hardware of the electronic device. After uploading the tracker software, step 410 includes converting the electronic device into a converted tracking device by making the tracking software operational and capable of performing the tracking functionalities. Thus, the converted tracking device can perform the tracking functionalities to acquire data from an SED and transmit the SED data to a tracking server computing system for data processing.

The data processing may include the features described in U.S. application Ser. No. 14/947,352 filed Nov. 20, 2015; U.S. application Ser. No. 14/947,388 filed Nov. 20, 2015; U.S. Provisional No. 62/345,598 filed Jun. 3, 2016; U.S. Provisional No. 62/082,212 filed on Nov. 20, 2014; U.S. Provisional No. 62/127,638 filed on Mar. 3, 2015; U.S. Provisional No. 62/197,462 filed on Jul. 27, 2015; and U.S. Provisional No. 62/197,464 filed Jul. 27, 2015, which are incorporated by reference in their entirety.

FIGS. 4A-4B show additional steps that may or may not be performed in the method 400. Step 412 includes analyzing the electronic device for conversion to a converted tracking device, which can be performed prior to Step 408. Here, step 412 can include analyzing the hardware for a memory that can store the tracking software and a processor for implementing the tracker functionality as well as for a means for uploading the tracker software and signal detection means for detecting a signal from a SED and a means for providing SED data to a tracker server computer system. Step 414 includes coupling a component module to the converted tracking device or to the electronic device before it is converted to the converted tracking device, where the module is any module from FIGS. 2 and 3B or other module to provide an additional function, such as an antenna module. The module can be a hardware module that provides an additional functionality to the converted tracking device.

Step 416 includes communicatively coupling the converted tracking device to a network, such as a tracking device network (mesh), the Internet, cellular network, or other network, where the network is communicatively coupled to a tracker server computing system. In one instance, step 416 can be performed prior to uploading the tracking software, where an example includes connecting an electronic device to the network so that the network can be used to upload the tracking software onto the electronic device. In an example, the tracker server computing system can be the converter having the tracker software such that the converter transmits the tracker software over the network to the electronic device.

Step 418 includes communicatively coupling the converted tracking device to the tracker server computing system, which may or may not include the aspects of Step 416. Step 420 includes connecting a memory device (e.g., portable memory device, flash, memory stick, etc.) having the tracking software to the electronic device for conversion to the converted tracking device. In step 420, the memory device can be a USB memory device or other memory device that can be plugged into an electronic device that has a processor so that the electronic device can operate with the tracking software on the memory device, where optionally the memory device can provide the tracking software to a memory device in the electronic device. Otherwise, the memory device can stay coupled with the electronic device to form the converted tracking device.

Step 422 can include executing the tracking software so that the converted tracking device is functional for performing the tracking functionality. Step 424 can include performing a diagnostic evaluation on the converted tracking device to make sure the hardware, firmware, or other component is capable of performing the tracking functionality. It should be recognized that any of these additional steps, without linking arrows, can be performed in any order or before or after other steps that make sense.

Figure 5:
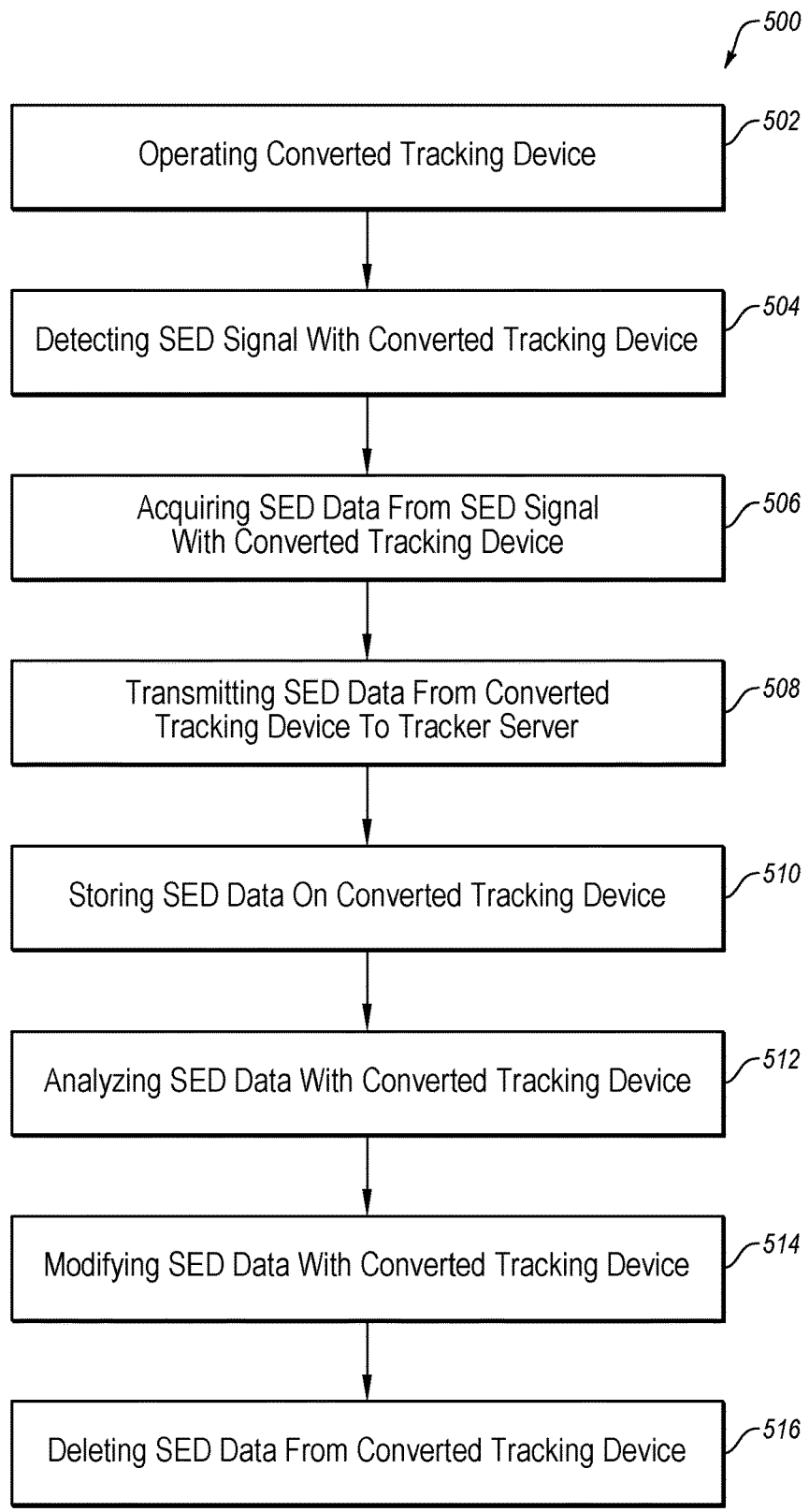
FIG. 5 illustrates an example method for using a converted tracking device to track a signal emitting device.

FIG. 5 illustrates a method 500 for using a converted tracking device to track SEDs. The method 500 can include Step 502 of operating the converted tracking device to perform the tracker functionalities of the tracker software. Accordingly, Step 504 can include detecting a signal from an SED with the converted tracking device. Step 506 can include acquiring data from the SED signal with the converted tracking device. Step 508 can include transmitting the SED data from the converted tracking device to the tracker server computing system. Once the tracker server computing system has the SED data, such data can be processed for tracking purposes, data analysis, and other functions such as those recited in the incorporated references.

FIG. 5 also shows additional steps that may or may not be performed in the method 500. Step 510 can include storing the SED data on the converted tracking device, where a memory device can be used for short term or long term SED data storage. Step 512 can include analyzing the SED data with the converted tracking device, where such analysis can include analyzing the data for a MAC address, SED identification, SED signal strength, duration SED is within distance of the converted tracking device, or other analysis. Step 514 can include modifying the SED data, such as by removing unwanted data aspects (e.g., to remove personal identifying information) or to add wanted data aspects (e.g., add time of acquisition, duration of time near converted tracking device, etc.) with the converted tracking device. Step 516 can include deleting the SED data from the converted tracking device, which can include deleting a portion of the acquired data (e.g., deleting the personal identifying information) or the entire acquired SED data. Also, individual data packets can be deleted.

In one embodiment, the converted signal tracker having the tracker software can process the acquired SED data to remove identifying data. In some instances, there may be laws, rules, or regulations regarding the type of information the converted signal tracker can process or retain, and any other information can be tagged and discarded. The converted signal tracker via the tracker software can be configured to only collect anonymous data relevant to the unique identifiers of each SED, but personal information about the user or other data may be discarded at the converted signal tracker.

The methods described herein can include one or more of: measuring signal strength from the SED with a converted signal tracker; measuring duration of signal detection with the converted signal tracker; identifying start of signal detection; identifying end of signal detection; triangulating the location of the SED relative to one or more converted signal trackers; or using trilateration to determine the location of the SED relative to one or more converted signal trackers.

The methods can include: recording signal data from one or more SEDs with a converted signal tracker and storing the signal data at the converted signal tracker; processing the signal data with the converted signal tracker to obtain processed signal data; uploading the processed signal data to the server computing system from the converted signal tracker; and purging the signal data and processed signal data from the converted signal tracker.

The methods can include recording signal data from one or more SEDs with a converted signal tracker and storing the signal data at the signal tracker; uploading the signal data to the server computing system from the converted signal tracker; and purging the signal data from the converted signal tracker.

The methods can include: storing signal data from a plurality of SEDs on the converted signal tracker; uploading the signal data to the server computing system from the converted signal tracker in a batch upload; and purging the signal data from the converted signal tracker.

The converted signal tracker can include a computing system with a memory device that has the tracker software as computer-executable code for performing the operations of the tracker software. The server computing system can include a memory device that has computer-executable code for performing analytics on the travel data obtained by the converted signal trackers from the SEDs.

The methods can include: plugging a computer device into a non-tracking device, wherein the computer device includes tracker software; and uploading the tracker software onto the non-tracking device so as to be converted to a converted signal tracker having the tracker software.

A signal tracker system can have a plurality of the converted signal trackers located in one or more of: a metropolitan area; a city; a county; a rural area; a highway road system; a surface street road system; a park; a parking facility; a shopping center; a store; an office building; a stadium; an event center; a ski resort; a lake; an amusement park; a bike path; or combination thereof.

In one embodiment, the computing systems of the network can process data to identify the location of an SED. The system can use trilateration or trilateration with two, or three or more converted signal trackers to essentially triangulate or trilaterate a position of each vehicle. This can be helpful to human or computer driven vehicles.

In one embodiment, the present technology can include a memory device (e.g., tangible, non-transitory) having a software development kit (SDK) stored thereon, where the SDK includes code to allow for conversion of an electrical device (e.g., non-tracking device) into a converted tracking device. The SDK provides for the code to be tailored for application to various types of electronic devices. In one aspect, the memory device can be on a computer, computing system, or cloud computing system. In one example, the tracker server computing system can include the SDK.

The technology allows for the SDK to be accessed and modified into tracker software for a specific type of device. Once the tracker software is configured from the SDK, the tracker software can be loaded onto a memory device of an electronic device for conversion to the converted tracking device. In one aspect, the SDK or tracker software can be downloaded onto an electronic device in order to update the electronic device and change the settings of the electronic device so that the electronic device maintains the ability to perform its function prior to having the tracker software and to also perform the functions of the tracker software as described herein. Additionally, the converted tracking device having the tracker software can receive updates, such as from the tracking server computing system, in order to modulate the performance of the tracking functions and optionally modulate the performance of the original functions. This allows for improvement in the electronic device and performance of the original functions and tracking functions over time. Also, the converter can include tracker software updates for updating the tracker software on the converted tracking device.

In one embodiment, an antenna, such as a WiFi antenna, is installed on an electronic device (e.g., non-tracking device or tracking device) so that when the tracker software is operational, the electronic device can detect WiFi signals and may use the antenna to communicate with the Internet. Similarly, any Bluetooth or other signal antenna may also be installed on an electronic device in order to perform the functions described herein.

In one embodiment, the converted tracking device does not have access to the internet (e.g., network), and thereby cannot communicate with the tracking server computing system. In order to overcome this obstacle in performing the tracking functions, the converted tracking device may be part of a system that includes a computer that has access to the Internet (e.g., via a network). Another way to overcome this obstacle is for the converted tracking device to have a memory device or access to a memory device (e.g., tangible, non-transitory) to store the SED data thereon, such that the SED data can be loaded (e.g., batch) onto a device (e.g., onto memory of the device) that can be communicatively coupled with a network in order to provide the SED data to the tracker server computing system. Accordingly, the converted tracking device can include means for storing and processing the tracker software, and means for detecting a signal, and means for obtaining data from a signal.

In one embodiment, the tracker software converts a router from only acquiring active connections to detecting signals from an SED for passive connection. The tracker software turns the router into a signal sniffer to detect signals, and then to acquire data from the signals, such as data that identifies the SED. The tracker software allows a router to receive data from an SED signal without actively making a connection with the SED. This allows the router to get information from an SED signal without providing information, data, or a signal to the SED.

In one embodiment, the present technology can be applied to other types of software than just tracking software. For example, the software can be configured to convert a device into a mapping device. This can allow for the software to be uploaded onto a camera, cellular tower, or a radar antenna to provide the function of mapping. This can allow various devices to be changed into mapping devices in order to map the physical world around the converted device. By monitoring and mapping the movement of devices from mapping device to mapping device, the software can understand the routes, utilization patterns and possible obstructions (e.g. walls, stairwells, roadways, etc.) in the path of the device.

In some embodiments, Vehicle-to-Infrastructure (V2I) technology may be implemented to add various functionality to the systems and methods described herein. For example, V2I technology may be implemented to initiate payment via the disclosed systems. The systems and methods may use V2I technology to facilitate making payments via the described communications protocol. For example, the methods and systems may be used to permit drivers to pay for wirelessly charging via inductive roadway, roadway tolls, parking, or other suitable transactions.

One non-limiting embodiment may include a method of converting an electronic device into a tracking device that is part of a system of tracking devices distributed throughout a geographic area to track signal emitting devices travelling through the geographic area. The method may include providing an electronic device, the electronic device may be positioned in the geographic area. The method may include communicatively coupling a converter with the electronic device. The converter may have a memory device with location tracking software stored thereon. The method may include uploading the tracking software from the converter to the electronic device so as to convert the electronic device into a converted tracking device having the tracking software. The converted tracking device may become part of the system of tracking devices distributed throughout the geographic area to track the signal emitting devices travelling through the geographic area. The method may include receiving, at the converted tracking device, unique identifiers corresponding to at least one of the signal emitting devices travelling through the geographic area. At least one of the unique identifiers may have been previously received by at least one of the tracking devices of the system prior to being received at the converted tracking device. The receipt of the unique identifier may be indicative of a proximity of the converted tracking device to the signal emitting devices based on the range of signals upon which the unique identifier is received. The method may include tracking, by the system of tracking devices distributed throughout the geographic area, the translocation of the signal emitting devices as the signal emitting devices travel through the geographic area based at least in part on the unique identifiers received at the converted tracking device and the proximity of the converted tracking device to the signal emitting devices determined by the range of the signals upon which the unique identifier is received at the converted tracking device from the signal emitting devices.

The translocation of the signal emitting devices may be further tracked based on unique identifiers received at the other tracking devices distributed throughout the geographic area and the proximity of the other tracking devices to the signal emitting devices determined by the range of the signals upon which unique identifiers are received at the other tracking devices from the signal emitting devices. The converter may be positioned outside of the geographic area. The method may include analyzing the electronic device for components capable of functioning as a converted tracking device prior to uploading the tracking software. The method may include communicatively coupling the converted tracking device to a network and communicatively coupling the converted tracking device to a tracker server computing system via the network.

The electronic device may be a non-tracking device before receiving the tracker software. The electronic device may not have at least some of the tracking capabilities of the tracking software before the tracking software may be uploaded to the electronic device. The electronic device may be devoid of tracker software and incapable of performing a tracking functionality before the tracking software is uploaded to the electronic device. The converted tracking device may be a router, repeater, or other electronic device prior to having the tracking software.

The method may include tracking the signal emitting devices, including: operating the converted tracking device; detecting an SED signal with the converted tracking device; acquiring SED data from the SED signal with the converted tracking device; and/or transmitting the acquired SED data or portion thereof from the converted tracking device to a tracker server computing system. The method may include storing SED data or portion thereof on a memory device of the converted tracking device; analyzing the SED data with the converted tracking device or the tracker server computing system; and/or modifying the SED data with the converted tracking device by the converted tracking device or the tracker server computing system.

The unique identifiers may be consistent unique identifiers that do not change over time and do not include a telephone number or an international mobile equipment identity (IMEI) number.

In another embodiment, a tracking system may include signal emitting devices located in a geographic area; tracking devices distributed throughout the geographic area to track the signal emitting devices travelling through the geographic area; and/or at least one converted tracking device positioned in the geographic area. The converted tracking device may be an electronic device that has been converted by uploading tracking software from a converter to the electronic device so as to convert the electronic device into a converted tracking device having the tracking software. The converted tracking device may become part of the tracking devices distributed throughout the geographic area to track the signal emitting devices travelling through the geographic area. The converted tracking device may be configured to: receive unique identifiers corresponding to at least one of the signal emitting devices travelling through the geographic area. At least one of the unique identifiers may have been previously received by at least one of the tracking devices of the system prior to being received at the converted tracking device. The receipt of the unique identifier may be indicative of a proximity of the converted tracking device to the signal emitting devices based on the range of signals upon which the unique identifier is received.

The system may be configured to track, using the tracking devices distributed throughout the geographic area and the converted tracking device, the translocation of the signal emitting devices as the signal emitting devices travel through the geographic area based at least in part on the unique identifiers received at the converted tracking device and the proximity of the converted tracking device to the signal emitting devices determined by the range of the signals upon which the unique identifier is received at the converted tracking device from the signal emitting devices.

The translocation of the signal emitting devices may be further tracked based on unique identifiers received at the other tracking devices distributed throughout the geographic area and the proximity of the other tracking devices to the signal emitting devices determined by the range of the signals upon which unique identifiers are received at the other tracking devices from the signal emitting devices.

The system may include the converter, and the converter may be positioned outside of the geographic area. The system may include a network communicatively coupled to the converted tracking device and the tracking devices. The system may include a tracker server computing system communicatively coupled to the converted tracking device and the tracking devices via the network. The tracker server computing system may be communicatively coupled to the signal emitting devices via the network. The electronic device may be a non-tracking device before receiving the tracker software. The electronic device may not have at least some of the tracking capabilities of the tracking software before the tracking software is uploaded to the electronic device.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In one embodiment, the present methods can include aspects performed on a computing system. As such, the computing system can include a memory device that has the computer-executable instructions for performing the method. The computer-executable instructions can be part of a computer program product that includes one or more algorithms for performing any of the methods of any of the claims.

In one embodiment, any of the operations, processes, methods, or steps described herein can be implemented as computer-readable instructions stored on a computer-readable medium. The computer-readable instructions can be executed by a processor of a wide range of computing systems from desktop computing systems, portable computing systems, tablet computing systems, hand-held computing systems as well as network elements, and/or any other computing device. The computer readable medium is not transitory. The computer readable medium is a physical medium having the computer-readable instructions stored therein so as to be physically readable from the physical medium by the computer.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one skilled in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a physical signal bearing medium include, but are not limited to, the following: a recordable type medium such as a floppy disk, a hard disk drive, a CD, a DVD, a digital tape, a computer memory, any other physical medium that is not transitory or a transmission. Examples of physical media having computer-readable instructions omit transitory or transmission type media such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include, but are not limited to, physically mateable and/or physically interacting components and/or wirelessly interactable and/or wirelessly interacting components and/or logically interacting and/or logically interactable components.

Figure 6:
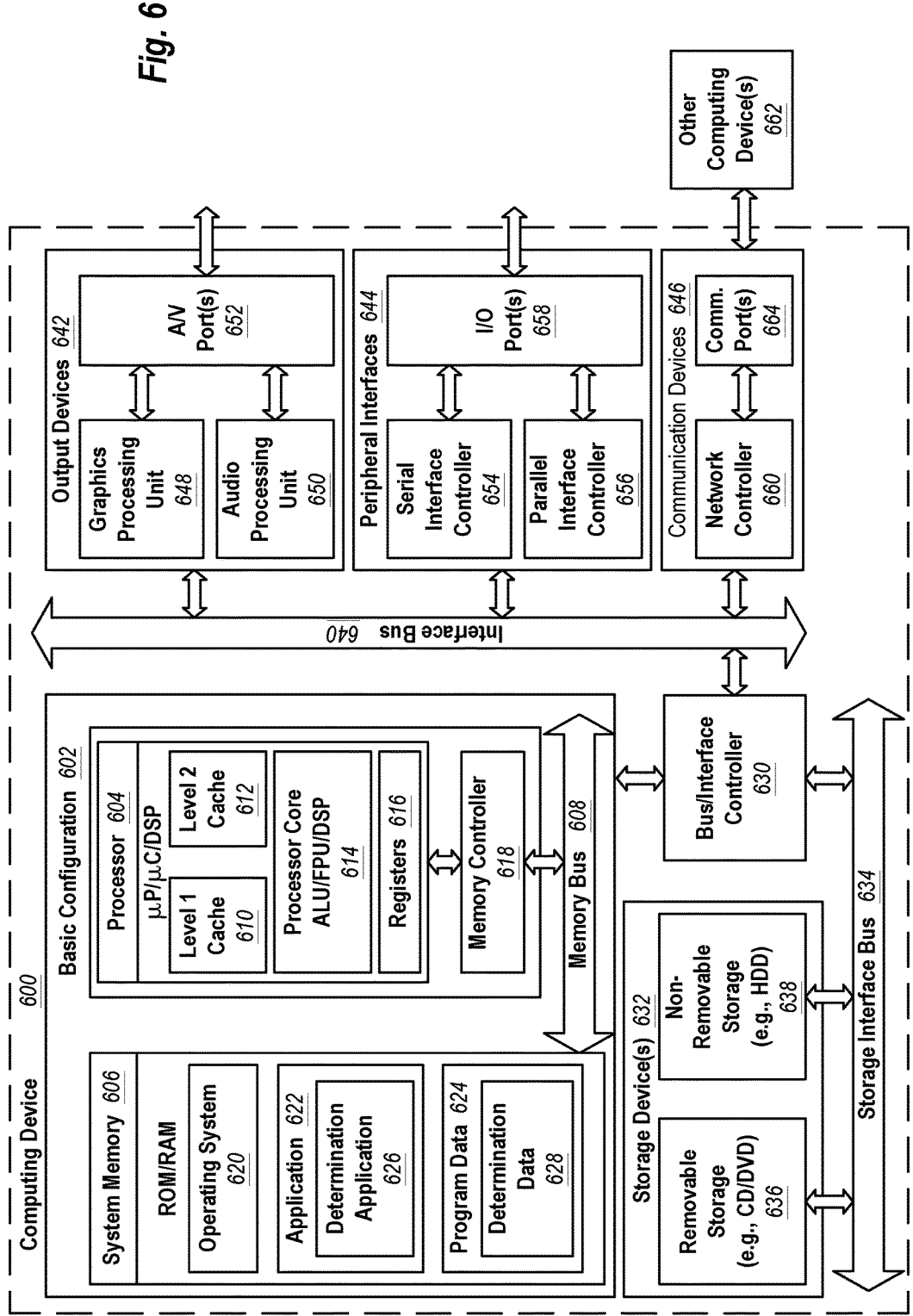
FIG. 6 illustrates a schematic view of an example computing device.

FIG. 6 shows an example computing device 600 that is arranged to perform any of the computing methods described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including, but not limited to, volatile memory (such as RAM), non-volatile memory (such as ROM, flash memory, etc.) or any combination thereof. System memory 606 may include an operating system 620, one or more applications 622, and program data 624. Application 622 may include a determination application 626 that is arranged to perform the functions as described herein including those described with respect to methods described herein. Program Data 624 may include determination information data 628 that may be useful for analyzing the contamination characteristics provided by the sensor unit. In some embodiments, application 622 may be arranged to operate with program data 624 on operating system 620 such that the work performed by untrusted computing nodes can be verified as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. The computing device 600 can also be any type of network computing device. The computing device 600 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All references recited herein are incorporated herein by specific reference in their entirety.

What is claimed is:

1. A method of converting an electronic device into a tracking device that is part of a system of tracking devices distributed throughout a geographic area to track signal emitting devices travelling through the geographic area, the method comprising:
   providing an electronic device, the electronic device positioned in the geographic area;
   communicatively coupling a converter with the electronic device, wherein the converter has a memory device with location tracking software stored thereon;
   uploading the tracking software from the converter to the electronic device so as to convert the electronic device into a converted tracking device having the tracking software, wherein the converted tracking device becomes part of the system of tracking devices distributed throughout the geographic area to track the signal emitting devices travelling through the geographic area;
   receiving, at the converted tracking device, unique identifiers corresponding to at least one of the signal emitting devices travelling through the geographic area, at least one of the unique identifiers having been previously received by at least one of the tracking devices of the system prior to being received at the converted tracking device, and the receipt of the unique identifier being indicative of a proximity of the converted tracking device to the signal emitting devices based on a range of signals upon which the unique identifier is received; and
   tracking, by the system of tracking devices distributed throughout the geographic area, the translocation of the signal emitting devices as the signal emitting devices travel through the geographic area based at least in part on the unique identifiers received at the converted tracking device and the proximity of the converted tracking device to the signal emitting devices determined by the range of the signals upon which the unique identifier is received at the converted tracking device from the signal emitting devices.

2. The method of claim 1, wherein the translocation of the signal emitting devices is further tracked based on unique identifiers received at the other tracking devices distributed throughout the geographic area and the proximity of the other tracking devices to the signal emitting devices determined by the range of the signals upon which unique identifiers are received at the other tracking devices from the signal emitting devices.

3. The method of claim 1, wherein the converter is positioned outside of the geographic area.

4. The method of claim 1, further comprising analyzing the electronic device for components capable of functioning as a converted tracking device prior to uploading the tracking software.

5. The method of claim 1, further comprising communicatively coupling the converted tracking device to a network and communicatively coupling the converted tracking device to a tracker server computing system via the network.

6. The method of claim 1, wherein the electronic device is a non-tracking device before receiving the tracker software.

7. The method of claim 1, wherein the electronic device does not have at least some tracking capabilities of the tracking software before the tracking software is uploaded to the electronic device.

8. The method of claim 1, wherein the electronic device is devoid of tracker software and incapable of performing a tracking functionality before the tracking software is uploaded to the electronic device.

9. The method of claim 1, wherein the converted tracking device was a router, repeater, or other electronic device prior to having the tracking software.

10. The method of claim 1, further comprising tracking the signal emitting devices (SEDs), comprising:
    operating the converted tracking device;
    detecting an SED signal with the converted tracking device;
    acquiring SED data from the SED signal with the converted tracking device; and
    transmitting the acquired SED data or portion thereof from the converted tracking device to a tracker server computing system.

11. The method of claim 10, further comprising:
    storing SED data or portion thereof on a memory device of the converted tracking device;
    analyzing the SED data with the converted tracking device or the tracker server computing system; and
    modifying the SED data with the converted tracking device by the converted tracking device or the tracker server computing system.

12. The method of claim 1, wherein the unique identifiers are consistent unique identifiers that do not change over time and do not include a telephone number or an international mobile equipment identity (IMEI) number.

13. A tracking system comprising:
    a plurality of signal emitting devices located in a geographic area;
    a plurality of tracking devices distributed throughout the geographic area to track the signal emitting devices travelling through the geographic area; and
    at least one converted tracking device positioned in the geographic area, the converted tracking device being an electronic device that has been converted by uploading tracking software from a converter to the electronic device so as to convert the electronic device into a converted tracking device having the tracking software, wherein:
    the converted tracking device becomes part of the tracking devices distributed throughout the geographic area to track the signal emitting devices travelling through the geographic area; and
    the converted tracking device is configured to:

receive unique identifiers corresponding to at least one of the signal emitting devices travelling through the geographic area, at least one of the unique identifiers having been previously received by at least one of the tracking devices of the system prior to being received at the converted tracking device, and the receipt of the unique identifier being indicative of a proximity of the converted tracking device to the signal emitting devices based on a range of signals upon which the unique identifier is received; and the system is configured to track, using the tracking devices distributed throughout the geographic area and the converted tracking device, the translocation of the signal emitting devices as the signal emitting devices travel through the geographic area based at least in part on the unique identifiers received at the converted tracking device and the proximity of the converted tracking device to the signal emitting devices determined by the range of the signals upon which the unique identifier is received at the converted tracking device from the signal emitting devices.

14. The tracking system of claim 13, wherein the translocation of the signal emitting devices is further tracked based on unique identifiers received at the other tracking devices distributed throughout the geographic area and the proximity of the other tracking devices to the signal emitting devices determined by the range of the signals upon which unique identifiers are received at the other tracking devices from the signal emitting devices.

15. The tracking system of claim 13, further comprising the converter, wherein the converter is positioned outside of the geographic area.

16. The tracking system of claim 13, further comprising a network communicatively coupled to the converted tracking device and the tracking devices.

17. The tracking system of claim 16, further comprising a tracker server computing system communicatively coupled to the converted tracking device and the tracking devices via the network.

18. The tracking system of claim 17, wherein the tracker server computing system is communicatively coupled to the signal emitting devices via the network.

19. The tracking system of claim 13, wherein the electronic device is a non-tracking device before receiving the tracker software.

20. The tracking system of claim 13, wherein the electronic device does not have at least some tracking capabilities of the tracking software before the tracking software is uploaded to the electronic device.

* * * * *